E. A. COBB.
BUTTON.
No. 117150 — Patented Jul 18 1871
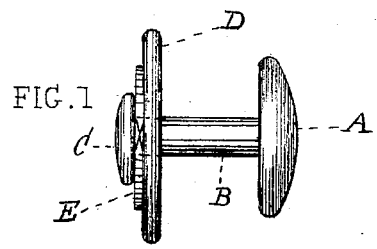
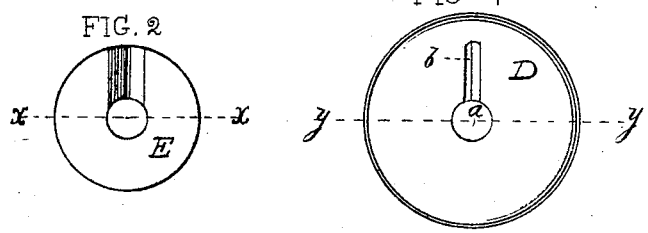
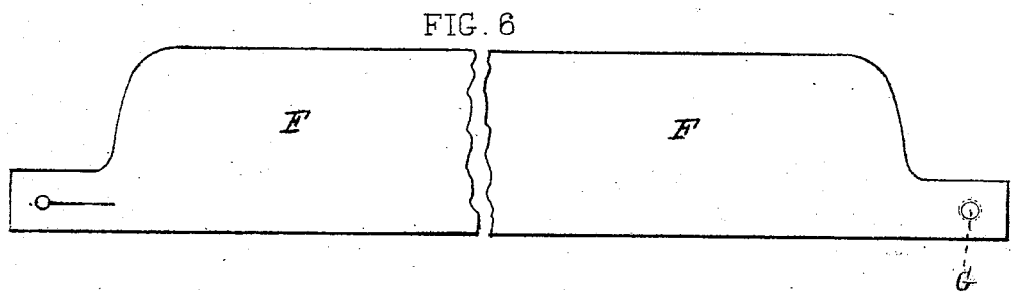
Witnesses
Thomas J. Bewley
Theo. N. Town Jr.
Inventor
Edward A. Cobb
By His Attorney
Stephen Ustick

117,150

UNITED STATES PATENT OFFICE.

EDWARD A. COBB, OF PHILADELPHIA, PENNSYLVANIA.

IMPROVEMENT IN BUTTONS.

Specification forming part of Letters Patent No. 117,150, dated July 18, 1871.

*To all whom it may concern:*

Be it known that I, EDWARD A. COBB, of the city of Philadelphia and State of Pennsylvania, have invented certain Improvements in Buttons for Shirts, &c., of which the following is a specification:

The nature of my invention consists of a stud-button, whose shank is provided with an interior head in combination with a washer made of metal or other rigid material, and a flexible washer which is placed between said washer and the head, and is brought inside the collar and neck-band to hold the button intact. The metallic washer has an inclined slot in it for the passage through of the flexible washer when the button has to be removed from the shirt, so as to avoid the necessity of removing the washer from the shank of the button.

In the accompanying drawing which makes a part of this specification, Figure 1 is a side view of the stud-button A B C, and washers D and E in connection therewith. Fig. 2 is a side view of the washer E. Fig. 3 is a cross-section at the line $x\ x$ of Fig. 2. Fig. 4 is a side view of the washer D. Fig. 5 is a cross-section at the line $y\ y$ of Fig. 4. Fig. 6 is a side view of the collar F.

Like letters in all the figures indicate the same parts.

A is a button which is provided with a shank, B, having a small head, C. D is a metallic washer on the shank B, and E is a thin flexible washer between the washer D and the head C. The said flexible washer has a slot at one end side to admit of its being pushed in its place on the shank B in front of the head C. All of these pieces are seen respectively in Figs. 2, 3, 4, and 5. F is a shirt-collar to which the button is attached. The eye $a$ of the washer D has an inclined slot, $b$, through which the flexible washer E is passed to get the said washer D in front of the washer E. The washer D is removed by a reverse passage of the washer E through the slot. The washer E may always remain on the shank B of the button, as the head C and washer may both be pushed through the small hole G in one end of the collar A and the like hole in the neck-band in making the connection with the shirt. The flexible washer E I usually make of thin leather or India rubber, but do not confine myself to these materials, as any thin flexible material having sufficient strength will answer the purpose, the flexibility being necessary for the convenience of passing the washer through the slot $b$ of the washer D.

I have shown the mode of connecting the improved button with a shirt-collar; it is also adapted to vests and other wearing apparel.

What I claim as my invention, and desire to secure by Letters Patent, is—

The washer D, having an inclined slot, $b$, projected from the eye $a$, in combination with the shank B of the button A, head C, and washer E, in the manner and for the purpose set forth.

In testimony that the above is my invention I have hereunto set my hand and affixed my seal this 1st day of June, 1871.

EDWARD A. COBB. [L. S.]

Witnesses:
 STEPHEN USTICK,
 THOMAS J. BEWLEY.